United States Patent [19]

Lee et al.

[11] Patent Number: 4,757,264
[45] Date of Patent: Jul. 12, 1988

[54] SAMPLE CLOCK SIGNAL GENERATOR CIRCUIT

[75] Inventors: Byung H. Lee, Holmdel; John R. Montalbano, Morganville, both of N.J.

[73] Assignee: American Telephone and Telegraph Company, AT&T Bell Laboratories, Murray Hill, N.J.

[21] Appl. No.: 105,835

[22] Filed: Oct. 8, 1987

[51] Int. Cl.⁴ ............... H03K 1/17; H03K 5/13; H04N 5/04; H04L 7/04
[52] U.S. Cl. .................... 328/63; 328/55; 328/155; 328/72; 328/137; 307/269; 307/262; 358/148; 375/111
[58] Field of Search ............ 328/55, 63, 155, 109, 328/137, 72; 307/269, 262, 510, 511; 375/113, 111, 119, 120; 331/1 R, 25, 1 A; 358/148, 149, 158

[56] References Cited

U.S. PATENT DOCUMENTS

| | | | |
|---|---|---|---|
| 4,386,323 | 5/1983 | Jansen | 375/119 |
| 4,527,522 | 7/1985 | Cerny | 123/416 |
| 4,543,661 | 9/1985 | Defeuilly et al. | 455/76 |
| 4,667,169 | 5/1987 | Matsuura et al. | 331/14 |
| 4,675,612 | 6/1987 | Adams et al. | 328/63 |
| 4,695,805 | 9/1987 | Massingill et al. | 307/269 |

OTHER PUBLICATIONS

Proc. 23rd Annual Frequency Control Symposium, May 6–8, 1969, Atlantic City, NJ, "Digiphase Synthesizer", G. C. Gillette, pp. 201–210.
Proc. 30th Annual Frequency Control Symposium, Jun. 2–4, 1976, Atlantic City, NJ, "An Efficient Hardware Implementation for High Resolution Freq. Synthesis", pp. 318–321, Bjerede et al.
Radio Electronics, Feb. 1977, Part I, pp. 47–49, "Using PLL for CB . . . ", R. F. Scott; Part II, pp. 58–59, Mar. 1977, "Using PLL . . . "; Part III, pp. 43–45, Apr. 1977.
Elektronik Industrie, 7/8 1977, "Frequenzsynthese mit dem . . . ", H. Kebler, pp. 9–10.
IEEE Trans. Consumers Electronics, vol. CE-24, No. 1, Feb. 1978, "A New Design Technique for Digital PLL Synthesizers", E. Breeze, pp. 24–33.
Electronic Product Design, May 1984, J. E. Owen, "Simple Synthesised Signal Source", p. 31.
Revista Telegrafica-Electronica, Agosto 1985, "Generador de senales", H. Abbate et al, pp. 860–863.
Electronics, "Manipulating Digital Xrays Enhances Different Features", Feb. 3, 1986, pp. 39–41.
Byte, The Small Systems Journal, May 1987, vol. 12, No. 5, McGraw-Hill, "Build a Gray-Scale Video Digitizer", S. Ciarcia, pp. 95–106; Byte, The Small Systems Journal, Jun. 1987, vol. 12, No. 6, Same Title & Author, pp. 129–138.

Primary Examiner—Stanley D. Miller
Assistant Examiner—Trong Quang Phan
Attorney, Agent, or Firm—Frederick B. Luludis

[57] ABSTRACT

A sample clock signal generator is implemented to output a signal that is phase-synchronized with an external signal having a frequency that is significantly lower than that of the output signal. The output signal is obtained by generating a series of time-separated signals each having the desired frequency and selecting as the output signal that one of the series having a falling edge occurring after a predetermined transition of the external signal.

10 Claims, 2 Drawing Sheets

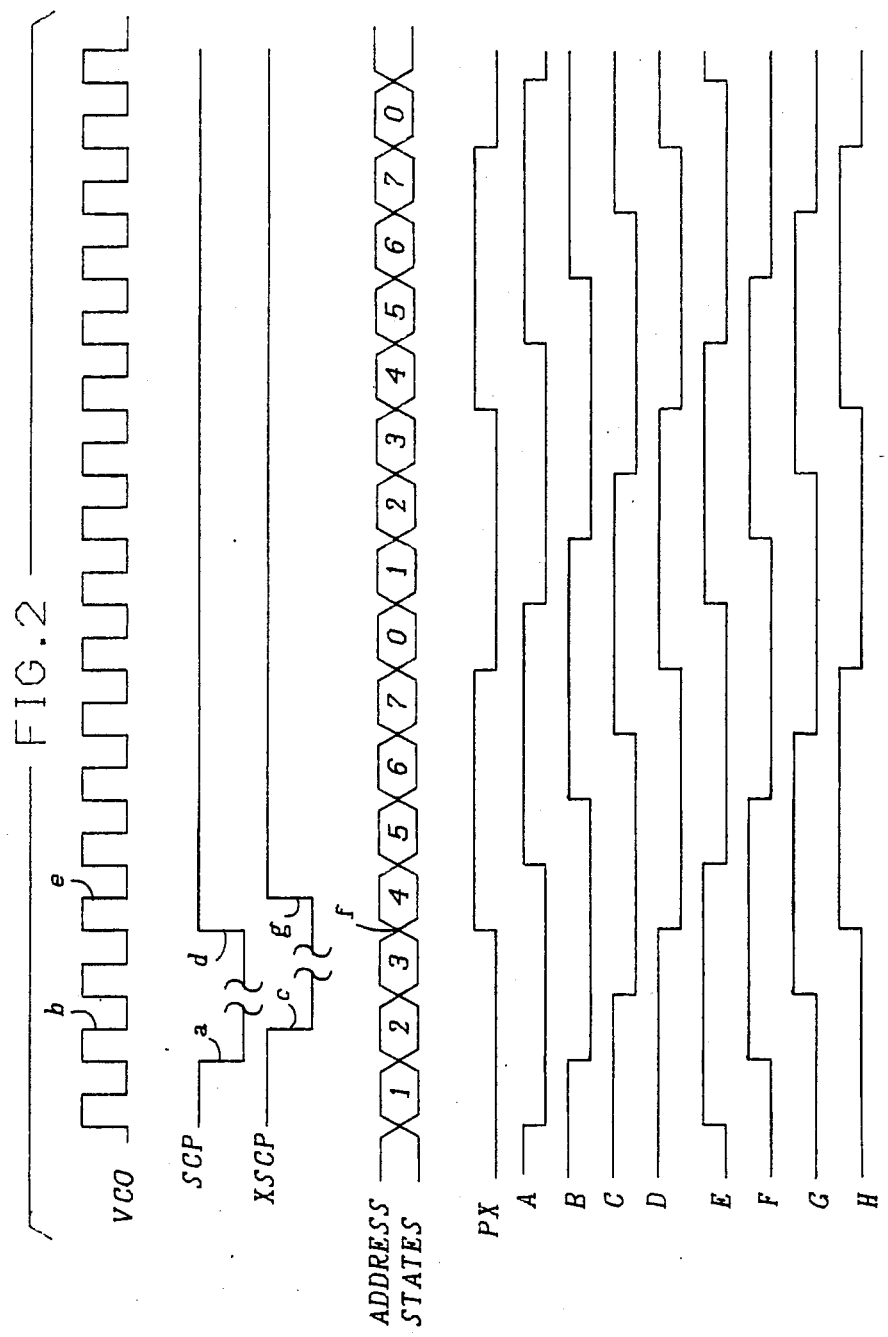

SAMPLE CLOCK SIGNAL GENERATOR CIRCUIT

FIELD OF THE INVENTION

This invention relates to acquisition devices, and more particularly, to a sample clock signal generator for use in such devices.

BACKGROUND OF THE INVENTION

In video signal processing and storage arrangements, each scan line in a video signal frame being generated by imaging equipment is obtained or "grabbed" by employing a circuit arrangement commonly referred to as a frame grabber. The imaging equipment being, for example, a video camera or video recorder which uses a standard video scanning format. A frame grabber circuit typically employs a conventional phase comparator and voltage controlled crystal oscillator (VCXO) connected in a phase-locked loop (PLL) circuit to generate a sample clock signal for digitally sampling the active portion of the video signal. The PLL circuit maintains a constant phase relationship between the sample clock signal and a horizontal sync signal employed by the respective imaging equipment. This ensures that the frame grabber samples the first and following picture elements, i.e., pixels, of each scan line at virtually the same point.

Digital imaging devices, used in medical applications, on the other hand, use nonstandard scanning formats as compared to the so-called "standard" formats used in prior known devices. For example, the scanning rate (pixel clock rate) used in such imaging devices could be between 4 Mhz and 32 Mhz and the frequency of the associated horizontal sync signal could be between 15 Khz and 32 Khz. Irrespective of such nonstandard scanning formats, it is desirable to sample the pixels at a rate equal to the pixel clock rate of the respective imagining device to ensure that each pixel is scanned only once. It is further desirable to synchronize the sample clock signal with the phase of the horizontal sync signal of the respective imaging device to ensure that the first pixel of each scan line is sampled at virtually the same point relative to the horizontal sync signal.

It would thus appear that a conventional PLL frequency synthesizer using the horizontal sync signal as the reference signal could provide the sample clock signal needed by a frame grabber circuit that may be employed in such medical image devices. However, we found this not to be the case. In fact, we found that a conventional VCXO at most deviates 2000 ppm and, therefore, cannot vary over a wide range of frequencies, such as, for example, a range of frequencies between 4 Mhz and 32 Mhz. In addition, a conventional PLL frequency synthesizer using a L-C tuned VCO designed to operate between 4 Mhz and 32 Mhz and using the horizontal sync signal as the reference signal provided to unstable. Specifically, once the synthesizer adapts and is outputting the desired sample clock rate, any small change in the phase of the horizontal sync signal causes the frequency of the L-C tuned VCO, and hence, the sample clock rate, to change significantly, thereby causing the frame grabber to either sample the same pixel more than once or fail to sample one or more pixels.

SUMMARY OF THE INVENTION

In accordance with an illustrative embodiment of the present invention, a sample clock signal generator is provided which generates a series of time-separated sample clock signals as well as respective addresses from a primary signal, in which the frequency of the primary signal is a predetermined multiple of the desired sample clock signal. Phase synchronization is then obtained by synchronizing a predetermined transition of the external horizontal sync signal with a predetermined transition of the primary signal and selecting that one of the series of addresses which is present at the time of such synchronization. The selected address, in turn, identifies its respective one of the series of sample clock signals, which is outputted as the phase-synchronized sample clock signal.

BRIEF DESCRIPTION OF THE DRAWING

In the Drawing:

FIG. 2 is a timing diagram showing one example of timing relationships between various functions performed by the present invention.

DETAILED DESCRIPTION

Figure 1:
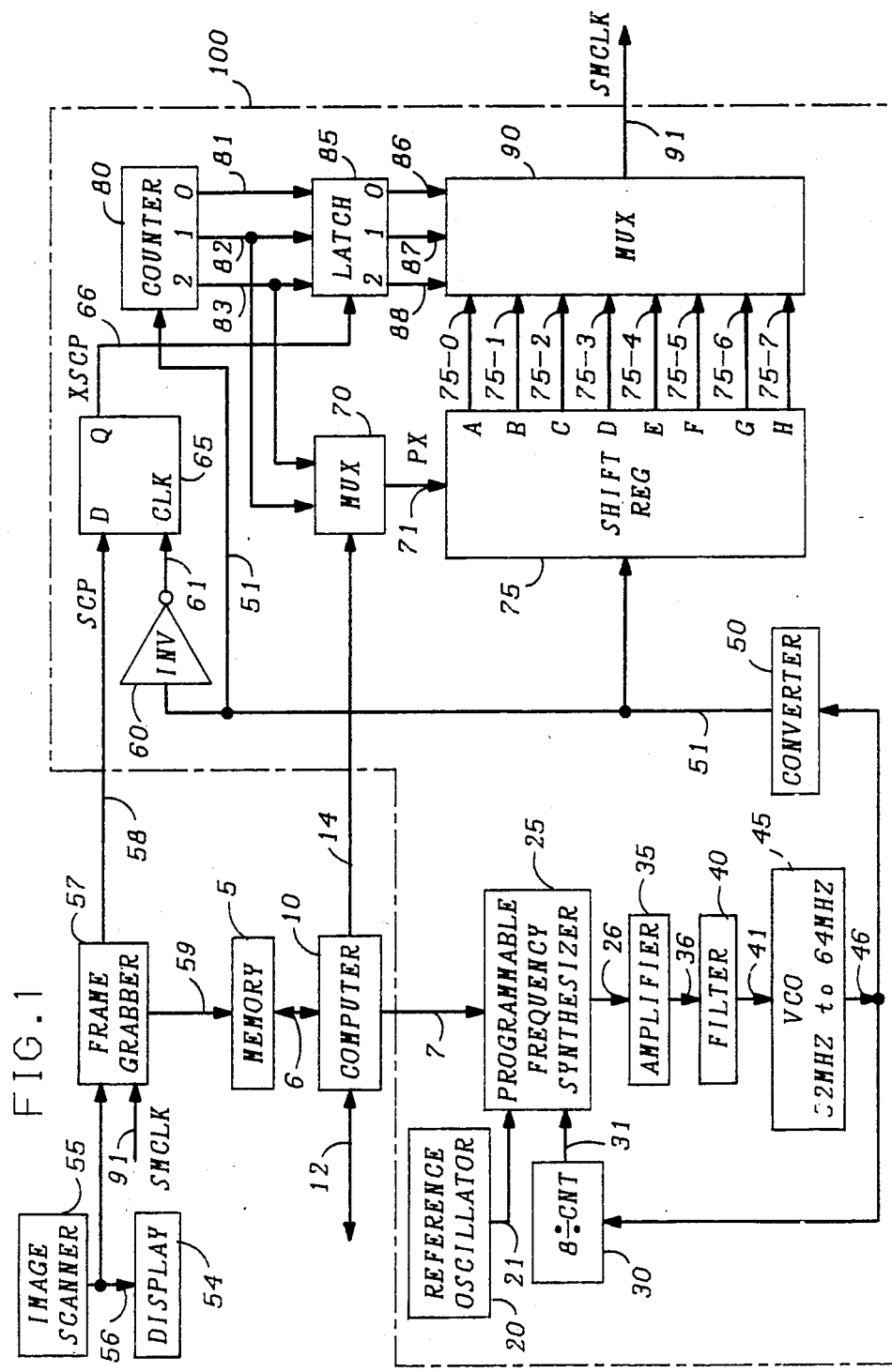
FIG. 1 illustrates a picture storage arrangement in which the present invention is illustratively implemented.

Turning now to FIG. 1 there is shown a broad block diagram of a so-called picture storage system in which the invention may be practiced. In such a storage system, a particular portion of the human anatomy is scanned and displayed locally. In addition, a frame(s) of the image is digitally "grabbed" and stored in memory. Thereafter, as user of the system may request a computer to display the image at a display that is either collocated with the system or remotely located.

Specifically, image scanner 55 may be any one of a number of commercially available image scanners, such as, for example, the General Electric, Inc. computerized tomography scanner (CT), model CT9800, which uses a 32 Khz horizontal sync signal and 26.688 Mhz pixel clock rate. CT scanners, as well as other image scanners, employ digital circuits which generate a pixel representation of the image being scanned. Image scanner 55 converts the pixels to analog signals before supplying them to display 54 via path 56. Display 54 being, for example, a raster scan display displays the image line by line from top to bottom. Scanner 55 also outputs a horizontal sync signal to mark the end of each scan line and a vertical sync signal to mark the end of a frame, or field, of the image.

Frame grabber circuit 57, which monitors path 56, obtains a copy of the image and stores it in memory, such as memory 5. The design and operation of a frame grabber circuit, such as circuit 57, is well known to the art and, therefore, will not be discussed herein. However, it suffices to say that frame grabber circuit 57 digitally samples each scan line of a frame of converted pixels that scanner 55 sends to display 54 to obtain a digital representation of the image. Thereafter, a user may enter a request to computer 10 via I/O interface bus 12 to display the stored image. Computer 10 responsive thereto unloads the image from memory 5 and displays it on an associated display (not shown).

It is noted that frame grabber circuit 57 may employ a sample clock signal having a rate that is either equal to or a fraction of the pixel clock rate of image scanner 55. In the former case, frame grabber 57 obtains a digital copy of the image within a single frame, and in the latter case within several or more frames. In either case, the sample clock signal employed by frame grabber 57 has to be phase synchronized with the horizontal sync signal of image scanner 55 in order to obtain an accurate copy of the scanned image. To achieve the requisite synchronization, frame grabber 57 separates the horizontal and vertical sync signals from the signals that it receives via lead 56 and supplies a composite of the horizontal and vertical sync signals to clock generator 100 via lead 58. Responsive to receipt of the horizontal sync signal, generator 100 returns to frame grabber 57 via path 91 a sample clock signal which is of the desired rate and which is phase synchronized with the phase of the horizontal sync signal.

In particular, computer 10 responsive to receipt of the identity of image scanner 55 supplies to generator 100 via bus 7 so-called R and N values, as will be discussed below. Generator 100 responsive to receipt of the R and N values generates a primary signal having a frequency that is an integral multiple of the desired clock rate. From this primary signal, generator 100 generates a series of addresses and a secondary signal having the desired clock rate. The secondary signal is then replicated to form a series of like signals each separated by the period of the primary signal. The replication of the secondary signal is done concurrently with the generation of the aforementioned addresses in order to associate the addresses with respective ones of the replicated secondary signals. Generator 100 responsive to the receipt of the trailing edge of the horizontal sync signal latches the most current one of the addresses into a register and uses that address to multiplex the respective replicated secondary signal to lead 91, the multiplexed signal being phase synchronized with the horizontal sync signal.

Thus, rather than using the horizontal sync signal as the reference signal to a phase comparator circuit, generator 100 uses that signal, in accordance with an aspect of the invention, to select one of a series of time-separated sample clock signal for each scan line generated by the imaging device, as will be discussed below.

We turn now to a more detailed discussion of sample clock signal generator 100.

Specifically, circuits 20, 25, 30, 35, 40 and 45 are arranged to operate as a phase-locked loop frequency synthesizer circuit that is programmable to output a signal whose frequency is illustratively between 32 Mhz and 64 Mhz. Programmable frequency synthesizer 25, which can be, for example, the Motorola Inc. integrated circuit model MC145145-1, includes, (a) a 12-bit divide-by-R counter which prescales the frequency of a signal received from reference oscillator 20 via lead 21, (b) a 14-bit divide- by-N counter which prescales the frequency of a signal received from counter 30 via lead 31, and (c) a phase comparator which compares the phase of the signal outputted by the divide-by-R counter with the phase of the signal outputted by the divide-by-N counter.

Reference oscillator 20 is a precision crystal oscillator designed to operate at a frequency of illustratively 3.579545 Mhz. The signal generated by oscillator 20 is supplied via lead 21 to the divide-by-R counter of frequency synthesizer 25, as mentioned above.

The R and N divide values required by synthesizer 25 to cause VCO 45 to operate at a particular frequency are supplied by computer 10 operating under the control of a clock control program (CC-P) stored in memory 5. Memory 5 is also used to store the software operating system that controls the overall operation of computer 10. It is further used to store a plurality of tables each containing the operating parameters of respective image scanners that may be connected to frame grabber 57, the parameters being, for example, the R and N divide values that need to be supplied to synthesizer 25. Each such table also contains a mode select bit that is used to select one of two versions of the VCO 45 output signal, as will be explained below. The clock control program responsive to receipt of the identity of the image scanner connected to frame grabber 57, translates the identity into an address which identifies the memory 5 location of the respective parameter table. The clock control program unloads from memory 5 the respective parameter table and supplies the divide by R and divide by N values to synthesizer 25 via bus 7 and supplies the mode bit to one-out-of-two MUX 70 via lead 14.

Once the R and N values have been loaded into synthesizer 25, its phase comparator changes the level of a control voltage that it is outputting to lead 26. The phase comparator continues to change the level of the control voltage until the frequency of the signal that is outputted by VCO 45 is a predetermined multiple of the desired sample clock rate and is in phase with the signal outputted by reference oscillator 20.

Amplifier 35 amplifies the level of the control voltage on lead 26 by a factor of illustratively 2.5 to meet the range of voltage levels expected by VCO 45. The amplified control voltage is then supplied to VCO 45 via low-pass filter 40 and leads 36 and 41. Low-pass filter 40, which is a tuned circuit, is designed in accordance with the equations designated (b) published in the Motorola Inc. CMOS/NMOS Special Functions Data Handbook (DL130) at page 6–43.

Voltage controlled oscillator (VCO) 45, which can be, for example, the VCO designated MC1648 manufactured by Motorola Inc., employs emitter-coupled logic (ECL) circuits. The design and operation of voltage controlled oscillators are well known to the art and will not be discussed herein. It suffices to say that VCO 45 generates and outputs to lead 46 the aforementioned primary signal whose frequency is determined by the frequency of the signal outputted by reference oscillator 20 and the level of the control voltage that appears on lead 41. In a preferred embodiment of the invention, VCO 45 outputs to lead 51 a primary signal having a frequency that is 4 (8) times the rate of the desired sample clock signal when the rate is between 8 MHz and 16 MHz (4 MHz and 8 MHz).

Counter 30 prescales the frequency of the VCO 45 output signal by dividing the frequency of the signal by a factor of illustratively 8 before supplying the signal to synthesizer 25.

Converter 50 converts the ECL level signals that are outputted by VCO 45 to lead 46 to a transistor-transistor logic level that is expected by the digital circuits appearing at the right-side of FIG. 1.

We turn now to a discussion of the digital selection circuitry that (a) divides the frequency of the primary signal outputted by VCO 45 by, for example, four or eight, to generate a signal having the desired sample clock rate, (b) generates, for example, four or eight, versions of the sample clock signal, and (c) selects that version thereof that is phase synchronized with the associated horizontal sync signal.

Specifically, the horizontal sync signal that is received via lead 58 causes one of eight binary addresses generated by counter 80 to be latched into latch 85 for the duration of the current scan line. The address that is latched into latch 85 identifies that version of the sample clock signal having a falling edge occurring closest in time after the trailing edge of the horizontal sync signal. It can be appreciated that the horizontal sync signal may be received at a time when counter 80 is in a transition state, i.e., between addresses. Therefore, the horizontal sync signal is only supplied to latch 85 at a time when counter 80 is outputting a valid address.

In particular, D-type flip/flop 65 "synchronizes" the horizontal sync signal with a valid counter 80 address by clocking the horizontal sync signal to the Q-output of flip/flop 65 and thence to latch 85 via lead 66 using the trailing edge of the primary signal outputted by VCO 45 and which is received via inverter 60 and lead 61. The leading edge of the same primary signal is used to clock counter 80, as will be discussed below.

Counter 80 is arranged as a three-bit binary counter which sequences through 8 distinct binary states responsive to receipt of a like number of primary signals received via converter 50 and lead 51, the 8 binary states being representative of the binary values 000 through 111 (or base 10 states 0 through 7). As will be discussed below, the 8 binary states generated by counter 80 represent the addresses of respective inputs to multiplexer 90, the inputs being connected to outputs A through H of shift register 75 via leads 75-0 through 75-7, respectively. Thus, the binary state of 000 represents the address of the signal appearing on lead 75-0, 001 represents the address of the signal appearing on lead 75-1, and so on. As such, multiplexer 90 responsive to receipt of one of the 8 binary states from latch 85 selects the signal appearing on the respective lead 75-0 through 75-7 and outputs the signal to lead 91, the selected signal being the desired sample clock signal.

Continuing, each of the 8 binary states generated by counter 80 are supplied to latch circuit 85 via leads 81 through 83, in which lead 81 supplies the so-called least significant bit and lead 83 supplies the so-called most significant bit of the respective binary state.

In addition, since counter 80 is a 3-bit counter, the level of the signal that appears on lead 82 changes on receipt of every fourth pulse from VCO 45 and the level of the signal that appears on lead 83 changes on the receipt of every eighth pulse from VCO 45. Thus, the signals that appear on leads 82 and 83 are representative of dividing the frequency (rate) of the signal outputted by VCO 45 by a factor of 4 and 8, respectively. Thus, when the frequency of the VCO primary signal that is supplied to counter 80 via lead 51 is, for example, 64 Mhz, a 16 Mhz version of that signal appears on lead 82 and an 8 Mhz version appears on lead 83.

Latch 85 responsive to the Q output of flip/flop 65 changing from illustratively 0 volts to +5 volts latches the binary address that it receives via leads 81 through 83 into respective registers. The latched address is then presented to multiplexer 90 via leads 86 through 88.

MUX 70 is a combinational circuit comprised of illustratively nand gates that are arranged as a 1-out-of-2 selector. MUX 70 responsive to receipt of the aforementioned mode bit via lead 14 selects one of the signals that it receives from counter 80 via leads 82 and 83 and passes the signal to its output lead 71 connected to shift register 75. As mentioned above, the selection of one of the two signals is controlled by the logical state of the mode bit. If the logical state of the mode bit is, for example, a 0, then MUX 70 selects the signal appearing on lead 82. Otherwise, its selects the signal appearing on lead 83.

Shift regiser 75 is an 8-bit parallel-output serial-shift register, which shifts the signal that it receives via lead 71 through each of its 8 stages responsive to receipt of the rising edge of a like number of primary VCO signals via lead 51. Thus, as will be shown graphically below, register 75 outputs a series of signals having the same frequency as the signal received via lead 71, but which are different in phase. For example, in the case where the signal on lead 71 happens to be the signal that is on lead 82 (83), then register 75 outputs to multiplexer 90 via leads 75-0 through 75-3 (75-0 through 75-7) four (eight) versions of that signal.

Multiplexer 90 multiplexes to lead 91 one of the signals appearing on a respective one of the leads 75-0 through 75-7 based on the address that it receives from latch 85, as mentioned above. The signals outputted by latch 85 thus form an address which is used to select the signal that is phase synchronized with the horizontal sync signal.

Turning now to FIG. 2, there is shown in graphical form an illustrative example of the timing relationship between various functions performed by sampe clock generator 100. The following explanation of FIG. 2 assumes that the primary signal outputted by VCO 45 has a frequency of 64 Mhz and that the desired frequency of the sample clock signal outputted to lead 91 is 8 Mhz. Thus, the value of the mode bit outputted by computer 10 will cause MUX 70 to pass the signal on lead 83 to shift register 75. The primary signal is designated VCO in FIG. 2.

It is seen from FIG. 2 that edge 'd' of external signal SCP which appears on lead 57 just happens to occur during the time that counter 80 is outputting invalid transition state 'f', whereas transition 'g' of signal XSCP, which is the signal outputted by flip/flop 65 to lead 66 and which is actually a delayed version of transition 'd', occurs during the time that counter 80 is outputting a valid address, i.e., address 4. Thus, transition 'g' of signal XSCP, rather than transition 'd' of signal SCP, is used to enable latch 85 to ensure that a valid address is latched into latch 85.

Specifically, when transition 'a' of external signal SCP goes low it is clocked to the output of flip/flop 65 on the next low going transition 'b' of signal VCO, thereby producing low going transition 'c' of signal XSCP. Similarly, the rising transition 'd' of signal SCP is clocked to the output of flip/flop 65 on the next low going transition 'e' of signal VCO, thereby producing rising tansition 'g' of signal XSCP. Thus, as a result of this process, edge 'g' always occurs during the time that counter 80 is outputting a valid address, which in the present example, happens to be address 4. (It is to be understood that addresses 0 through 7 shown in FIG. 2 are representative of binary addresses 000 through 111, respectively.)

Since it is assumed that the desired rate of the pixel clock signal that is to be outputted to lead 91 is to be 8 Mhz, the 8 Mhz version of the 64 Mhz primary (VCO) signal tht appears on lead 83 is supplied to shift register 75, as represented by signal PX. As mentioned above, register 75 responsive to the leading edge of respective primary (VCO) signals causes signal PX to be shifted through each of its eight stages, thereby generating a like number of signals designated A through H and time separated by the period of the 64 Mhz primary (VCO) signal. Of the eight signals E through H, only signal E is associated with address 4 and, is therefore, outputted to lead 91 as the phase-synchronized sample clock signal.

The foregoing is merely illustrative of the principles of our invention. Those skilled in the art will be able to devise numerous arrangements which, although not explicitly shown or described herein, embody those principles and are within its spirit and scope. For example, the primary (VCO) signal could be almost any multiple of the desired sample clock signal. In addition, the number of sample clock signals produced by shift register 75 could be either increased or decreased or even be commensurate with the chosen multiple. Further, the particular implementation of the selection circuit described herein could be reduced to a gating arrangement in which the the leading edge of the horizontal sync signal, or any other reference signal, inhibits the gate and in which the trailing edge thereof enables the gate so that the next and following primary (VCO) signals can pass through the gate and thence to illustratively the frame grabber circuit.

What is claimed is:

1. Apparatus for outputting to a terminal a signal that is phase synchronized with an external signal, said external signal being received from an external source of signals, said apparatus comprising
    means for receiving said external signal,
    means for receiving a primary signal from a signal generator,
    means for generating a series of time-separated signals from said primary signal,
    means responsive to receipt of said external signal for generating a signal substantially representative of said external signal, said generated signal having a predetermined transition synchronized with a predetermined transition of said primary signal, and
    means responsive to said synchronized transition for selecting one of said series of signals as a function of said synchronized transition and for outputting said selected signal as said phase-synchronized signal.

2. The apparatus set forth in claim 1 wherein the frequency of said primary signal is a predetermined multiple of the frequency of each of said series of time-separated signals.

3. The apparatus set forth in claim 1 wherein said time separation is substantially equal, to the period of said primary signal.

4. The apparatus of claim 2 wherein said means for generating said series of signals includes means for dividing the frequency of said primary signal by at least said predetermined multiple to generate a secondary signal and for serially replicating said secondary signal to generate said series of signals.

5. Apparatus comprising
    means for receiving a repetitive primary signal of a predetermined frequency from a signal generator.
    means for receiving an external signal from a source of signals,
    means responsive to receipt of said primary signal for generating a series of time-separated signals and respective addresses from said primary signal, and
    means responsive to receipt of said external signal and said primary signal for generating a signal having a predetermined transition synchronized with a predetermined transition of said primary signal and for outputting to a terminal that one of said series of signals whose respective address occurs during said synchronized transition.

6. The signal generator set forth in claim 5 wherein the frequency of said primary signal is a predetermined multiple of the frequency of each of said series of signals.

7. The signal generator of claim 6 wherein said means for generating said series of signals includes means for dividing the frequency of said primary signal by at least said predetermined multiple to generate a secondary signal and for serially replicating said secondary signal to generate said series of signals, said series of signals being time separated from one another and said time seperation being substantially equal to the period of said primary signal.

8. The signal generator set forth in claim 5 wherein said means for generating said primary signal includes a programmable phase-locked loop frequency synthesizer circuit having a voltage controlled oscillator and a reference oscillator.

9. Apparatus for generating a sample clock signal, said sample clock signal having a predetermined frequency and being phase synchronized with an external signal, said apparatus comprising
    means for receiving said external signal,
    means for receiving frequency programming instructions from an external source of such instructions and for generating a first signal having a frequency defined by said instructions, said frequency of said first signal being a predetermined multiple of the frequency of said sample clock signal,
    means responsive to said first signal for generating a second signal and a series of addresses,
    means responsive to said first and second signals for generating a series of time-separated signals each having a frequency substantially equal to the predetermined frequency of said sample clock signal, said series of timeseparated signals being associated with respective ones of said addresses, and
    means responsive to said external signal for generating a signal substantially a replica of said external signal and having a trailing transition synchronized with a predetermined transition of said first signal and for outputting as said sample clock signal that one of said series of signals whose respective one of said addresses occurs during said trailing transition.

10. A method of generating a signal having a predetermined frequency and phase synchronized with an external signal comprising the steps of,
    receiving said external signal,
    generating a primary signal,
    generating a series of signals, each of said series of signals having a frequency substantially equal to said predetermined frequency,
    generating a series of adresses associated with respective ones of said series of signals,
    generating an address electing signal as a function of said external signal and said primary signal, and
    outputting as said phase-synchronized signal that one of said series of signals whose respective one of said addresses occurs during a predetermined transition of said address selecting signal.

* * * * *

UNITED STATES PATENT AND TRADEMARK OFFICE
CERTIFICATE OF CORRECTION

PATENT NO. : 4,757,264

DATED : July 12, 1988

INVENTOR(S) : Byung H. Lee and John R. Montalbano

It is certified that error appears in the above-identified patent and that said Letters Patent is hereby corrected as shown below:

Column 1, line 56, "provided to unstable" should read --proved to be unstable--.
Column 3, line 39, "signal" should read --signals--.
Column 8, line 40, "timeseparated" should read --time-separated--.
Column 8, line 59, "electing" should read --selecting--.

Signed and Sealed this

Twenty-ninth Day of November, 1988

Attest:

DONALD J. QUIGG

*Attesting Officer*   *Commissioner of Patents and Trademarks*